Dec. 8, 1925.  
S. E. ALLEY  
1,564,505  
SELF PROPELLED VEHICLE  
Filed May 25, 1925    3 Sheets-Sheet 1

INVENTOR  
S. E. Alley.  
BY Watson, Coit, Morse & Grindle  
ATTYS.

Dec. 8, 1925. 1,564,505
S. E. ALLEY
SELF PROPELLED VEHICLE
Filed May 25, 1925  3 Sheets-Sheet 2
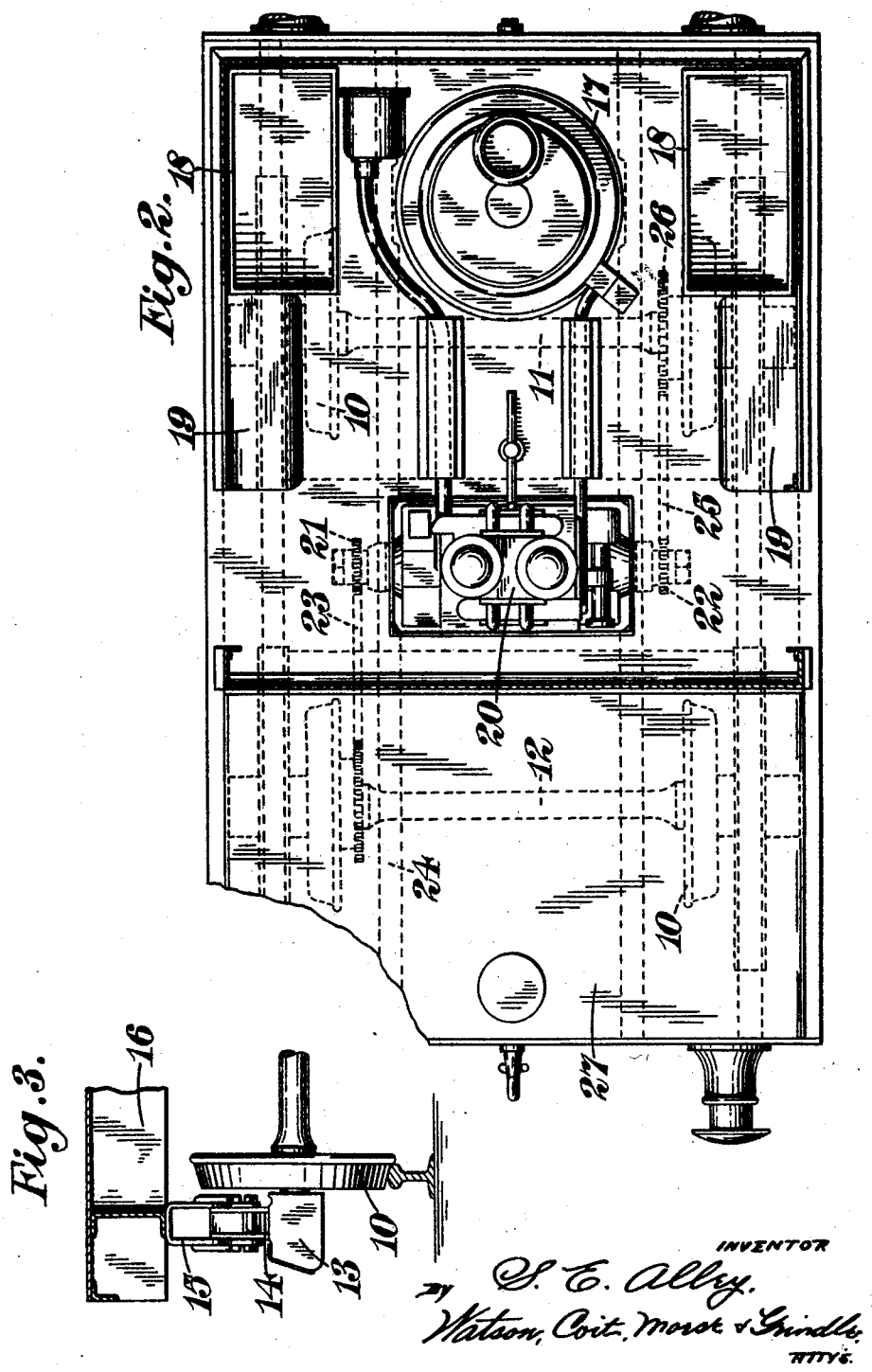

Dec. 8, 1925.
S. E. ALLEY
1,564,505
SELF PROPELLED VEHICLE
Filed May 25, 1925
3 Sheets-Sheet 3
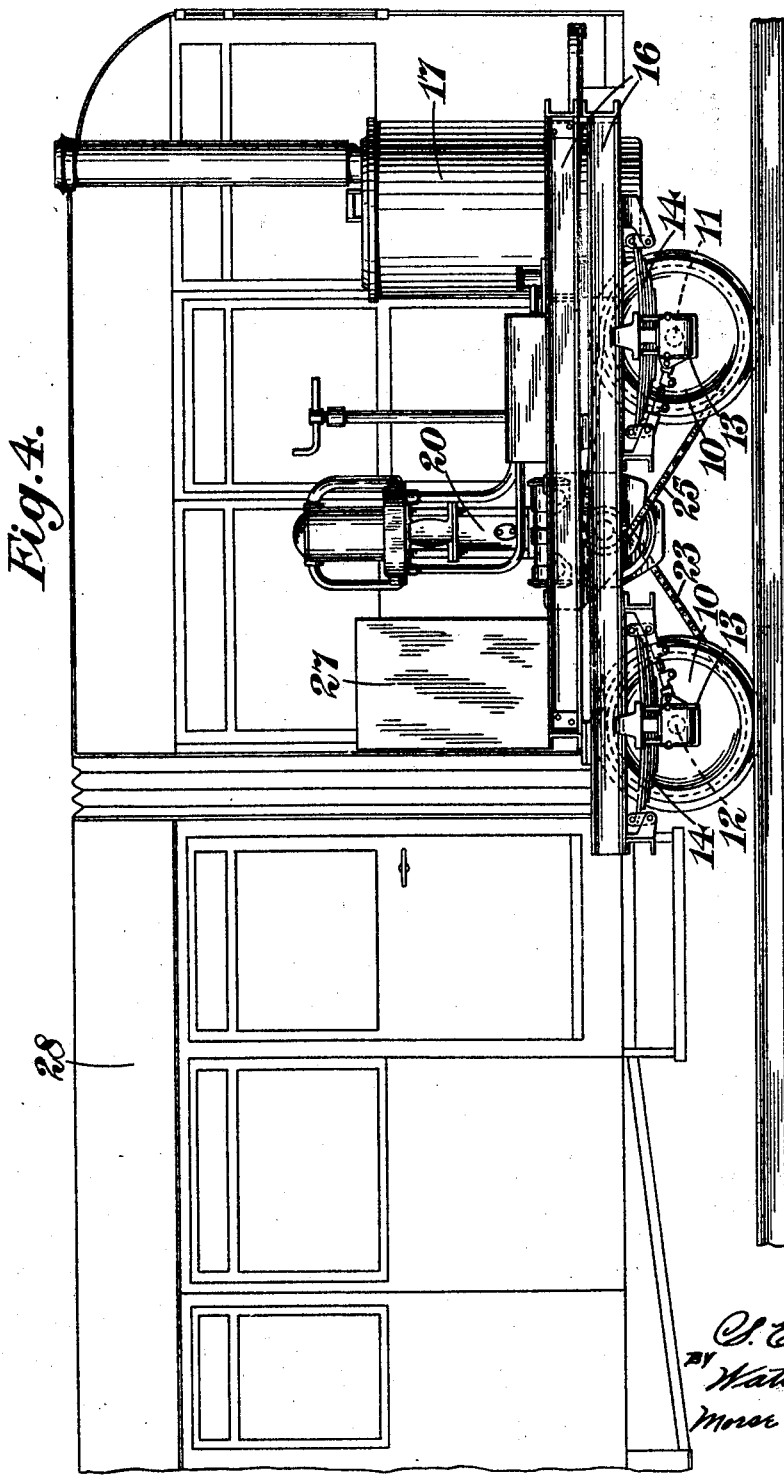

Patented Dec. 8, 1925.

1,564,505

UNITED STATES PATENT OFFICE.

STEPHEN EVANS ALLEY, OF LONDON, ENGLAND.

SELF-PROPELLED VEHICLE.

Application filed May 25, 1925. Serial No. 32,764.

*To all whom it may concern:*

Be it known that I, STEPHEN EVANS ALLEY, a subject of the King of England, residing at London, England, have invented certain new and useful Improvements in Self-Propelled Vehicles, of which the following is a specification.

This invention is for improvements in or relating to self-propelled vehicles and has for one of its objects to improve the balance, stability and road adhesion of the vehicle. Other objects are to simplify the driving gear and render available more space for the driver's cab than has heretofore been possible. The invention is particularly applicable to chain-driven railway locomotives and tractor units for railway coaches, but it is to be understood that it is also of utility in connection with four-wheeled road vehicles.

According to the primary feature of the present invention there is provided a steam-propelled vehicle having two or more running wheel axles, and having its chassis and certain other component parts of the vehicle arranged as follows, namely, a steam engine unit being mounted on the vehicle chassis at a situation which viewed in plan is between two running-wheel axles and also having the cylinder or cylinders in the unit vertical or substantially out of the horizontal and the crankshaft at the lower end of said unit and arranged to drive the vehicle directly, i. e. without the interposition of a counter-shaft, through the intermediary of chains, the chassis overhanging beyond a running-wheel axle of the vehicle (for example the front axle), and receiving there a steam boiler in such a position that its bottom fittings are exposed and freely accessible and can be detached and lowered beyond the said running-wheel axle, and the chassis being weighted at the other end, above or beyond the other running-wheel axle, by a water tank, fuel reservoir, front end of a following coach, or other means. Steam-propelled vehicles embodying some of the constructional arrangements just specified have been proposed, but the complete combination and arrangement of parts delimitated is believed to be novel. By adopting it a stable, smooth running and well balanced vehicle is provided which has simple driving means and has its parts suitably arranged for ready inspection.

The crankshaft may drive through chains to one running-wheel axle from one end and to another running-wheel axle from its other end, and it is preferred to arrange that the crankshaft axis lies in or below the plane of the main longitudinals of the chassis so that the lines joining such axis to the axes of the running-wheel axles approach the horizontal.

It is a feature of the invention to arrange that the engine unit, in the particular combination and arrangement of vehicle parts above specified, is mounted on the chassis in such a position that it is exposed and freely accessible from the underneath and can be detached and lowered between the said running wheel axles.

For a more complete understanding of the invention there will now be described, by way of example only and with reference to the accompanying drawings, certain constructions of self-propelled vehicles according to the invention. It is to be understood, however, that the invention is not restricted to the precise constructional details illustrated.

In these drawings.

Figure 2 is a plan view thereof with the driver's canopy removed.

Figure 3 is an end view of certain detail parts of the vehicle, and

Figure 4 is a side elevation of a steam-driven tractor unit for a railway coach, constructed according to the present invention. The principal items of the unit are shown in full lines while items of lesser importance, and also the adjacent part of the passenger portion of the coach are shown in chain lines.

Like reference numerals indicate like parts throughout the drawings.

Figure 1:
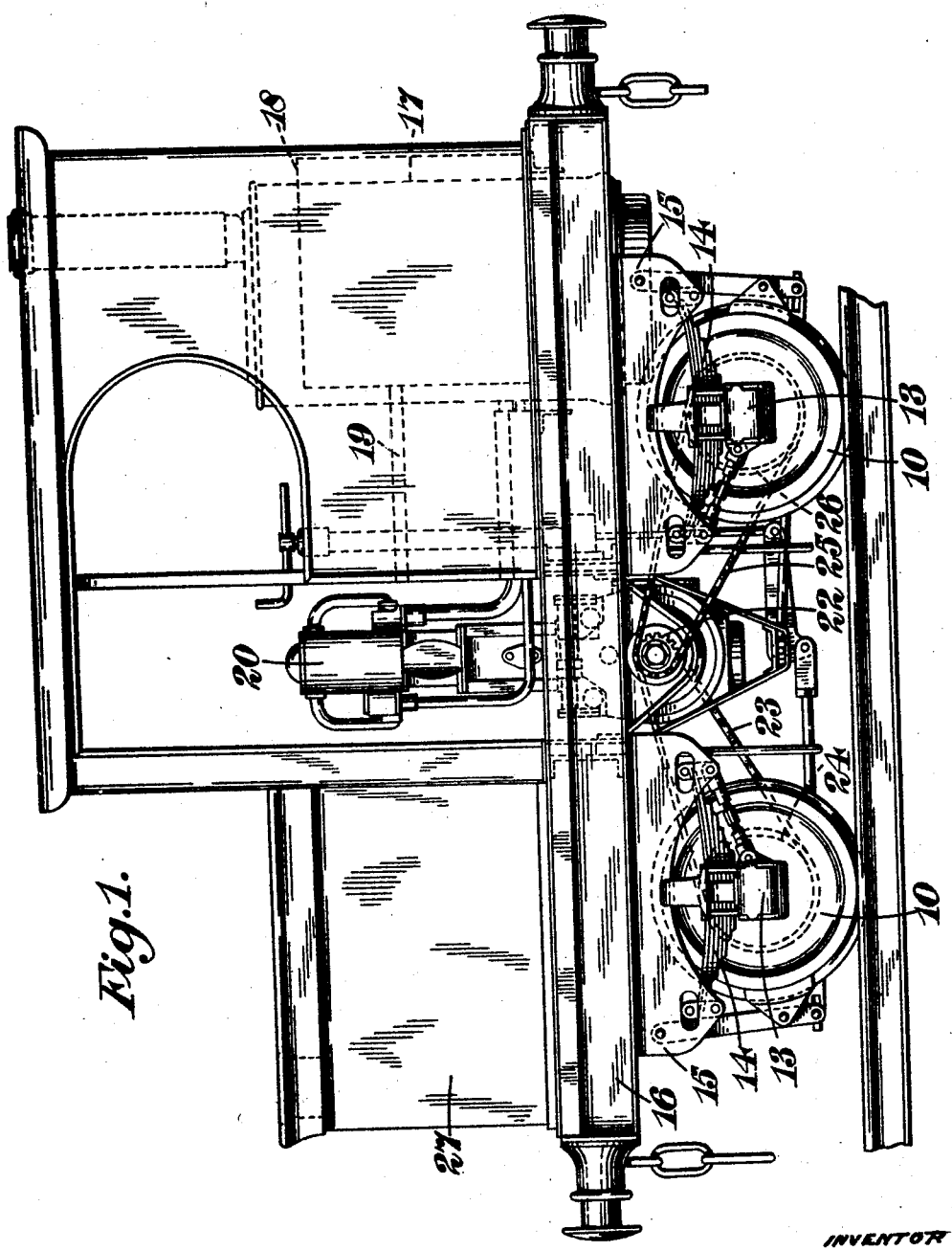
Figure 1 is a side elevation of a steam-driven locomotive embodying the invention.

Referring firstly to Figures 1, 2 and 3, the vehicle therein illustrated has four running-wheels 10 mounted upon a front axle 11 and a rear axle 12. At each end of each axle is an axle box 13 to which a leaf spring 14 is attached. The ends of the springs 14 reach into the interior of down-turned channel members 15 of U cross-section, and the springs are connected to these channel members by links and the channel members themselves are mounted underneath the chassis 16 of the vehicle. It will be seen that the chassis 16 overhangs at the front and rear beyond the running-wheel axles. At the front overhang there is mounted a vertical steam boiler 17, and referring more particularly to Figure 2 it will be seen that the situation of the boiler is such that its bottom fittings are exposed and freely accessible and can be detached and lowered vertically beyond the front axle 11. In this way inspection, cleaning and repair are facilitated. At each side of the boiler water tanks or fuel bunkers 18 are provided and to the rear of them seats 19 for the operators.

Towards the middle of the length and width of the vehicle there is mounted on the chassis a vertical engine 20. This engine is so situated that it is exposed and freely accessible from the underneath of the chassis and can be detached and lowered between the axles 11 and 12. Overhaul can, therefore, be effected without disturbing the driver's cab or other fittings upon the upper part of the chassis. The engine illustrated has two vertical cylinders but it is to be understood that it is within the scope of the invention to have one or any larger number of cylinders which may either be vertical or angularly set so long as they are substantially out of the horizontal. The engine crankshaft is at the lower end of the engine, and in the construction illustrated lies somewhat below the plane of the chassis 16. The crankshaft extends laterally of the length of the vehicle and is provided towards its ends with chain wheels 21 and 22. The wheel 21 is connected by a chain 23 to a chain wheel 24 on the rear axle 12, and the wheel 22 is connected by a chain 25 to a chain wheel 26 on the front axle 11. The drive of the axles is therefore accomplished without the interposition of a counter-shaft and very simple driving connections are, therefore, possible. The crankshaft may in some cases include a differential gear such as is described in United States Patent No. 1498604, granted June 24, 1924, to G. Woodvine and myself as joint inventors, if desired. The chain wheels 21 and 22 may be of the same sizes as, or different sizes from, the wheels 24 and 26 according to circumstances.

The rear end of the chassis carries a water tank or fuel bunker 27. The general arrangement of the parts on the chassis above described will be found to balance the vehicle satisfactorily in most cases but extra weight, in the form of say metal weights, can be added at suitable places on the chassis if necessary in order to change the balance or secure additional wheel adhesion.

The locomotive illustrated has only two running-wheel axles, but more could be provided if desired, say for the purpose of reducing the load per axle. Any additional axles could be driven from the nearest main axle by chains or coupling rods if desired. In another alternative construction instead of driving both of the axles 11 and 12 by chains from the engine crankshaft, only one of the axles is so driven and the other is rotated in unison by coupling rods.

The locomotive shown in Figures 1, 2 and 3 is a self-contained unit and can be attached to any train of vehicles that it is required to move. In the arrangement shown in Figure 4, however, the locomotive is formed as part of a unit with a passenger coach 28 which may be of any desired construction. The construction of the driving unit shown in Figure 4 is substantially the same as that shown in Figures 1–3 in so far as the vertical boiler, vertical engine, and chain drive to the axles are concerned. The crankshaft axis is situated somewhat higher than in the construction shown in the earlier figures and the channel members 15 are not employed. Part of the weight of the passenger portion of the coach 28 is carried upon the rear end of the chassis of the locomotive unit.

From the foregoing, it will be appreciated that by adopting the arrangements according to the present invention the driving gear is simplified, ample room secured for the driver's cab, and the various important parts of the vehicle made readily accessible for inspection and repair. In both constructions illustrated, the crankshaft axis lies in or below the plane of the main longitudinals of the chassis. Consequently, the lines joining such axis to the axes of the running-wheel axles approach the horizontal. Being thus substantially out of the vertical, smoothness of running and driving will be facilitated, since the direct transmission of vertical thrusts from the engine to the running wheels will be avoided.

It is to be understood that the invention is not restricted to the precise constructional details set forth; for instance the engine crankshaft may be arranged to take its driving sprockets at different positions lengthwise of its axis in order to permit the vehicle to be accommodated to different gauges of railway lines.

I claim:—

1. A steam-propelled vehicle comprising in combination a plurality of running-wheel axles, a vehicle chassis, a steam engine unit comprising a cylinder and a crankshaft, which unit is mounted on the chassis at a situation which, viewed in plan, is between two running-wheel axles and has the cylinder in the unit substantially out of the horizontal and the crankshaft at the lower end of said unit, a chain and chain wheels for directly driving the vehicle from the crankshaft without the interposition of a counter-shaft, the chassis overhanging beyond a running-wheel axle of the vehicle, a steam boiler mounted on said overhanging portion in such a position that its bottom fittings are exposed and freely accessible and can be detached and lowered beyond the said running-wheel axle, and means for weighting the chassis at its other end.

2. A steam-propelled vehicle comprising in combination a plurality of running-wheel axles, a vehicle chassis, a steam engine unit comprising a cylinder and a crankshaft, which unit is mounted on the chassis at a situation which, viewed in plan, is between two running-wheel axles and has the cylinder in the unit vertically arranged with the crankshaft at the lower end of said unit, a direct chain driving attachment between the crankshaft and a running-wheel axle without the interposition of a counter-shaft, the chassis overhanging beyond a running-wheel axle of the vehicle, a steam boiler mounted on said overhanging portion in such a position that its bottom fittings are exposed and freely accessible and can be detached and lowered beyond the said running-wheel axle, and means for weighting the chassis at its other end.

3. A steam-propelled vehicle comprising in combination a plurality of running-wheel axles, a vehicle chassis, a steam engine unit comprising a cylinder and a crankshaft, which unit is mounted on the chassis at a situation which, viewed in plan, is between two running-wheel axles and has the cylinder in the unit substantially out of the horizontal and the crankshaft at the lower end of said unit, a chain and chain wheels for directly driving the vehicle from the crankshaft without the interposition of a counter-shaft, the chassis overhanging beyond the front running-wheel axle of the vehicle, a steam boiler mounted on said overhanging portion in such a position that its bottom fittings are exposed and freely accessible and can be detached and lowered beyond the said running-wheel axle, and weighting means applied to the chassis at its other end above the other running-wheel axle.

4. A steam-propelled vehicle comprising in combination a plurality of running-wheel axles, a vehicle chassis, a steam engine unit comprising a cylinder and a crankshaft, which unit is mounted on the chassis at a situation which, viewed in plan, is between two running-wheel axles and has the cylinder in the unit vertically arranged with the crankshaft at the lower end of said unit, a direct chain driving attachment between the crankshaft and a running-wheel axle without the interposition of a counter-shaft, the chassis overhanging beyond a running-wheel axle of the vehicle, a steam boiler mounted on said overhanging portion in such a position that its bottom fittings are exposed and freely accessible and can be detached and lowered beyond the said running-wheel axle, and a water tank and fuel reservoir mounted on the chassis at its other end 5. A steam-propelled vehicle comprising in combination a plurality of running-wheel axles, a vehicle chassis, a steam engine unit comprising a cylinder and a crankshaft, which unit is mounted on the chassis at a situation, which, viewed in plan, is between two running-wheel axles and has the cylinder in the unit substantially out of the horizontal and the crankshaft at the lower end of said unit, a chain wheel on each end of said crankshaft, a chain connecting one of said wheels to one running-wheel axle and another chain connecting the other wheel to the other running-wheel axle, in each case without the interposition of a counter-shaft, the chassis overhanging beyond a running-wheel axle of the vehicle, a steam boiler mounted on said overhanging portion in such a position that its bottom fittings are exposed and freely accessible and can be detached and lowered beyond the said running-wheel axle, and means for weighting the chassis at its other end.

6. A steam-propelled vehicle comprising in combination a plurality of running-wheel axles, a vehicle chassis, a steam engine unit comprising a cylinder and a crankshaft, which unit is mounted on the chassis at a situation which, viewed in plan, is between two running-wheel axles and has the cylinder in the unit vertically arranged with the crankshaft at the lower end of said unit, and at such a level that the lines joining such axis to the axes of the running-wheel axles approach the horizontal, a direct chain driving attachment between the crankshaft and a running-wheel axle without the interposition of counter-shaft, the chassis overhanging beyond a running-wheel axle of the vehicle, a steam boiler mounted on said overhanging portion in such a position that its bottom fittings are exposed and freely accessible and can be detached and lowered beyond the said running-wheel axle, and means for weighting the chassis at its other end.

7. A steam-propelled vehicle comprising in combination a plurality of running-wheel axles, a vehicle chassis, a steam engine unit comprising a cylinder and a crankshaft, which unit is mounted on the chassis at a situation which, viewed in plan, is between two running-wheel axles and is such that the engine unit is exposed and freely accessible from the underneath and can be detached and lowered between the said running-wheel axles, said unit having the cylinder substantially out of the horizontal and the crankshaft at the lower end of the unit, a chain and chain wheels for directly driving the vehicle from the crankshaft without the interposition of a counter-shaft, the chassis overhanging beyond a running-wheel axle of the vehicle, a steam boiler mounted on said overhanging portion in such a position that its bottom fittings are exposed and freely accessible and can be detached and lowered beyond the said running-wheel axle, and means for weighting the chassis at its other end.

8. A steam-propelled vehicle comprising in combination a plurality of running-wheel axles, a vehicle chassis, a steam engine unit comprising a cylinder and a crankshaft, which unit is mounted on the chassis at a situation which, viewed in plan, is between two running-wheel axles and is such that the engine unit is exposed and freely accessible from the underneath and can be detached and lowered between the said running-wheel axles, said unit having the cylinder vertical and the crankshaft at the lower end of the unit, a chain and chain wheels for directly driving the vehicle from the crankshaft without the interposition of a counter-shaft, the chassis overhanging beyond a running-wheel axle of the vehicle, a vertical steam boiler mounted on said overhanging portion in such a position that its bottom fittings are exposed and freely accessible and can be detached and lowered beyond the said running-wheel axle, and a water tank and fuel reservoir mounted on the chassis at its other end.

In testimony whereof I affix my signature.

STEPHEN EVANS ALLEY.